Figure 1:
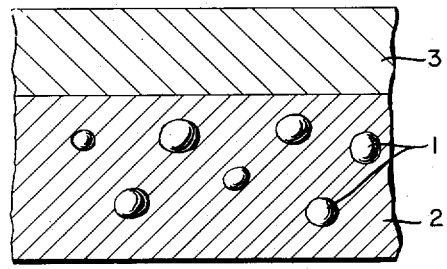

Feb. 21, 1961     G. B. ALEXANDER ET AL     2,972,529

METAL OXIDE-METAL COMPOSITION

Filed May 12, 1958

INVENTORS
GUY B. ALEXANDER
RALPH K. ILER
SHERWOOD F. WEST

BY Fred C. Carlson

ATTORNEY

United States Patent Office 2,972,529
Patented Feb. 21, 1961

2,972,529

METAL OXIDE-METAL COMPOSITION

Guy B. Alexander and Ralph K. Iler, Brandywine Hundred, and Sherwood F. West, Christiana Hundred, Del., assignors to E. I. du Pont de Nemours and Company, Wilmington, Del., a corporation of Delaware Filed May 12, 1958, Ser. No. 734,624

12 Claims. (Cl. 75—.5)

This invention is concerned with improving the high temperature mechanical properties, especially strength and creep resistance, of ductile metals. The metals improved are those having an oxide, the free energy of formation at 27° C. of which is up to 75 kilocalories per gram atom of oxygen in the oxide. The improvement is accomplished by incorporating extremely minute discrete particles of a refractory metal oxide into the metal to be improved and diluting this mixture with chromium which bonds the first metal to the minute particles. The products in which the metal mixture has a melting point above 700° C. are novel compositions.

More particularly, the invention is directed to such metalliferous compositions comprising a dispersion, in a mixture having a melting point above 700° C., of (a) a metal having an oxide with a free-energy of formation ($\Delta F$) at 27° C. of up to 75 kilocalories per gram atom of oxygen in the oxide, and (b) chromium metal, of (c) substantially discrete particles, having an average dimension of 5 to 500 millimicrons (m$\mu$) and a surface area, in square meters per gram, of from 12/D to 1200/D where D is the density of the particles in grams per milliliter, said particles comprising a refractory metal oxide which is insoluble in the metal mixture, is thermally stable to at least 500° C., and has a melting point above 1000° C. and a $\Delta F$ at 1000° C. above 90 kilocalories per gram atom of oxygen, the proportion of bonding metal being at least 4 mol percent based upon the dispersed metal oxide particles.

The invention is further particularly directed to processes for producing the novel compositions, the processes comprising surrounding the refractory metal oxide, in the form of separate particles having an average dimension of 5 to 500 millimicrons, with a metal having an oxide with a $\Delta F$ at 27° C. of up to 75 kilocalories per gram atom of oxygen, and diluting said metal with chromium metal, while maintaining the oxide as separate particles.

Figure 2:
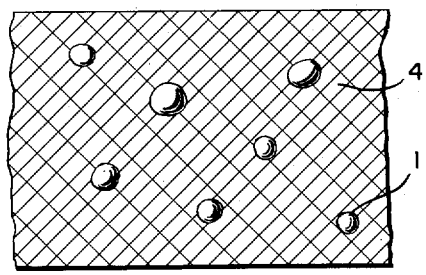

In the drawings:

Figure 1 represents a cross-section of a mass of bonding metal superimposed upon a mass of the other metal of a composition of the invention, there being dispersed in the latter metal the discrete refractory oxide particles, and Figure 2 represents a cross-section of a composition of the invention in which the metal dispersion of refractory oxide particles of Figure 1 has been diluted with the bonding metal of Figure 1 in accordance with a process of the invention.

Recent technological advances have emphasized the desirability of improving the mechanical properties of metals at high temperatures. Metals and alloys, which at temperatures well below their melting points perform satisfactorily as materials of construction, tend to creep under load at higher temperatures approaching ½ to ⅔ of their melting points, and eventually fail at stresses only a fraction of those which can be sustained for a short time.

The usual metallurgical approach to this problem has been the development of new alloys, but these alloys often have failed to be satisfactory because of having high oxidation rates or being unworkable by available forming techniques.

In prior efforts to improve the high-temperature properties of metals it has been thought that care should be used to eliminate oxide occlusions. Expensive procedures have been employed for purging oxygen and oxygen compounds from molten masses of metals.

In the manufacture of cermets, powdered metal techniques have been worked out whereby certain metals containing oxide coatings are shaped as a sintered mass, and upon cooling, heterogeneous masses are obtained. Cermets are essentially refractory particles bound together with metal, the metal oxide particles being substantially larger than 1 micron. While cermets have found valuable applications in industry, they are totally lacking in ductility, hence are deficient in impact strength, and are used only in specialty applications.

In contrast to the cermets and to prior art metals containing occlusions of oxide impurities, the present invention is concerned with metal compositions which are not brittle. Rather, they have sufficient ductility that under enough stress to cause rupture they will yield and deform before they break. While the ductility of the novel compositions is not ordinarily increased over the corresponding unmodified metals, and often is less, it is sufficient to impart impact strength, and to permit fabrication by such conventional techniques as forging and rolling.

More particularly, it has now been found that the high temperature stress support, creep resistance, and resistance to long-term microstructural changes of a metal having an oxide with a free energy of formation at 27° C. up to 75 kilocalories per gram atom of oxygen are substantially improved by surrounding refractory metal oxide particles with the metal, said particles being substantially discrete, stable at temperatures up to 500° C., and having an average dimension of 5 to 500 millimicrons, a surface area, in square meters per gram, of 12/D to 1200/D where D is the density of the particles in grams per milliliter, a melting point above 1000° C., and a free energy of formation at 1000° C. above 90 kilocalories per gram atom of oxygen, and diluting said surrounding metal with another metal which acts to bond the metal mixture to the particles, the bonding metal being chromium, the proportion of bonding metal being at least 4 mol percent based upon the refractory oxide particles. Products produced by such processes, wherein the melting point of the metal mixture is above 700° C., are novel compositions of the invention.

For convenience in describing this invention certain abbreviations will be used. Free energy of formation will be kilocalories per gram atom of oxygen in the oxide, as determined at 27° C. unless otherwise specified, and will be called $\Delta F$. Chromium which has an oxide having a $\Delta F$ of more than 75 will be referred to as a "bonding" metal. Metals having an oxide with a $\Delta F$ less than 75 will be called "inactive" metals. Surface areas of the refractory oxides will be square meters per gram, and particle diameters will be millimicrons, abbreviated m$\mu$. Particle densities will be grams per milliliter. The particulate refractory oxide will sometimes be referred to as the filler.

THE FILLER

In processes of this invention, a relatively non-reducible oxide is selected as the filler, that is, an oxide which is not reduced to the corresponding metal by hydrogen, or by the metal in which it is embedded, at temperatures below 1000° C. Such fillers have a $\Delta F$ at 1000° C. of more than 90 kilogram calories per gram atom of oxygen in the oxide. The oxide itself can be used as the starting material or it can be formed during the process by heating another metal-oxygen-containing material.

The metal-oxygen-containing material can, for example, be selected from the group consisting of oxides, carbonates, oxalates, and, in general, compounds which, after heating to constant weight at 1500° C., are refractory metal oxides. The ultimate oxide must have a melting point above 1000° C. A material with a melting point in this range is referred to as "refractory"—that is, difficult to fuse. Filler particles which melt or sinter at lower temperatures become aggregated.

The filler can be a mixed oxide, particularly one in which each oxide conforms to the melting point and $\Delta F$ above-stated. Thus, the filler is a single metal oxide or a reaction product of two or more metal oxides; also, two or more separate oxides can be used as the filler. The term "metal oxide filler" broadly includes spinels, such as $MgAl_2O_4$, metal aluminates, metal silicates such as zircon, and metal zirconates.

Typical single oxide fillers are alumina, zirconia, magnesia, hafnia, and the rare earth oxides including didymium oxide and thoria. A typical group of suitable oxides, and their free energies of formation is shown below:

| Oxide: | $\Delta F$ at 1000° C. |
|---|---|
| $Y_2O_3$ | 125 |
| CaO | 122 |
| $La_2O_3$ | 121 |
| BeO | 120 |
| $ThO_2$ | 119 |
| MgO | 112 |
| $UO_2$ | 105 |
| $HfO_2$ | 105 |
| $CeO_2$ | 105 |
| $Al_2O_3$ | 104 |
| $ZrO_2$ | 100 |
| BaO | 97 |
| $ZrSiO_4$ | 95 |
| TiO | 95 |

The filler oxide must be in a finely divided state. The substantially discrete particles should have an average dimension in the size range from 5 to 500 m$\mu$, an especially preferred range being from 5 to 250 m$\mu$, with a minimum of 10 m$\mu$ being even more preferred. (Note that 250 m$\mu$ particles have a surface area of 24/D and 10 m$\mu$ of 600/D.)

The particles should be dense and anhydrous for best results, but aggregates of smaller particles can be used, provided the discrete particles of aggregate have the above-mentioned dimensions. Particles which are substantially spheroidal or cubical in shape are also preferred, although anisotropic particles such as fibers or platelets can be used for special effects.

The size of a particle is given as an average dimension. For spherical particles all three dimensions are equal and the same as the average. For anisotropic particles the size is considered to be one third of the sum of the three particle dimensions. For example, a fiber of asbestos might be 500 m$\mu$ long but only 10 m$\mu$ wide and thick. The size of this particle is $$\frac{500+10+10}{3}$$

or 173 m$\mu$, and hence within the limits of this invention. Colloidal metal oxide aquasols are particularly useful as a means of providing the fillers in the desired finely divided form and hence are preferred. Zirconia sols are useful as starting materials. Such sols as described by Weiser in "Inorganic Colloidal Chemistry," volume 2, "Hydrous Oxides and Hydroxides," for example, can be used.

Although they are less preferred, aerogels and reticulated powders can also be used. In these instances it is necessary that the aggregate structures be broken down to particles in the size range specified.

Powders prepared by burning metal chlorides, as, for example, by burning zirconium tetrachloride to produce a corresponding oxide, are also very useful if the oxides are obtained primarily as discrete, individual particles, or aggregated structures which can be dispersed to such particles.

Calcium oxide is a particularly preferred filler. Since this oxide is water-soluble or, more accurately, water-reactive, one cannot obtain it as an aqueous dispersion in the colloidal state. In this instance, one can use an insoluble calcium compound, such as the carbonate or oxalate, which, on heating, will decompose to the oxide. Thus, for example, particles of finely divided calcium carbonate can be coated with an oxide of the metal in which it is to be dispersed, e.g., hydrous iron oxide, by treating a dispersion of finely divided calcium carbonate with a base and a salt of the metal, e.g., ferric nitrate and sodium carbonate. On heating the precipitate and reducing, a dispersion of calcium oxide in iron is obtained. Similarly, one can obtain dispersions of barium oxide, strontium oxide, or magnesia in the metal being treated.

Whatever method is selected for preparing the filler oxide should give a product having not only the ultimate particle size as above stated, but also having a surface area, in square meters per gram, of from 12/D to 1200/D, where D is the density of the particles in grams per milliliter. For instance, thoria particles have a density of 9.7 gm./ml.; hence when thoria is used as a filler it should have a surface area of from 1.2 to 124 square meters per gram.

The refractory oxide, selected as the filler as above described, must be one which is relatively insoluble in the metal mixture in which it is to be used. If the oxide dissolved, it would, of course, lose its necessary physical characteristics and become valueless for its intended use.

Similarly, the refractory oxide filler must be thermally stable to at least 500° C. Again, if the oxide decomposed upon heating it would lose its physical and chemical identity, and since the products of the invention are intended for use at elevated temperatures, this limitation as to thermal stability is essential.

THE INACTIVE METAL

The inactive metal into which the filler is to be dispersed according to this invention must be a metal having an oxide which has a $\Delta F$ at 27° C. of up to 75 kilocalories per gram atom of oxygen in the oxide. This group includes metals whose oxides can be reduced by hydrogen at 1000° C.

More specifically the metals in the following table are classed as inactive metals for the purposes of the present disclosure:

| Inactive Metal | Oxide | $\Delta F$ of Oxide at 27° C. |
|---|---|---|
| Iron | FeO | 59 |
| Cobalt | CoO | 52 |
| Nickel | NiO | 51 |
| Copper | $Cu_2O$ | 35 |
| Cadmium | CdO | 55 |
| Thallium | $Tl_2O$ | 40 |
| Germanium | $GeO_2$ | 58 |
| Tin | SnO | 60 |
| Lead | PbO | 45 |
| Antimony | $Sb_2O_3$ | 45 |
| Bismuth | $Bi_2O_3$ | 40 |
| Molybdenum | $MoO_2$ | 60 |
| Tungsten | $WO_3$ | 60 |
| Rhenium | $ReO_3$ | 45 |
| Indium | $In_2O_3$ | 65 |
| Silver | $Ag_2O$ | 3 |
| Gold | $Au_2O$ | 0 |
| Ruthenium | $RuO_2$ | 25 |
| Rhodium | $Rh_2O$ | 20 |
| Palladium | PdO | 15 |
| Osmium | $OsO_4$ | 20 |
| Platinum | PtO | 0 |

The present invention is especially useful in preparing dispersions of refractory oxide particles in the higher melting group of inactive metals, that is, those having melting points above about 1450° C. Thus, processes of the invention are especially well adapted for making dispersions in iron, cobalt, nickel, molybdenum and tungsten.

THE BONDING METAL

The bonding metal with which the inactive metal is diluted in processes and compositions of this invention must have an oxide which has a ΔF at 27° C. above 75 kilocalories per gram atom of oxygen in the oxide, and is, in fact, chromium.

MELTING POINT OF INACTIVE METAL-BONDING METAL MIXTURE

In the composition of this invention the inactive metal and bonding metal are so selected with respect to each other that the melting point of their mixture is above 700° C. The proportions of the two metals will, of course, influence the melting point, but in any event the compositions of the invention are inclusive of mixtures of inactive and bonding metals having a melting point above 700° C. If more than a single inactive metal is present, the mixture must nevertheless respond to this limitation.

The melting point referred to is that of the metal mixture without the dispersed refractory oxide. Those skilled in the art, desiring to prepare a particular mixture of inactive and bonding metal, will have no difficulty determining the melting point of the mixture by conventional techniques. If the melting point is above 700° C., the product obtained by dispersing a refractory filler therein according to the herein-described processes will be a composition of the present invention. Of course, the processes of the invention can also be applied to mixtures melting below 700° C.

SURROUNDING THE REFRACTORY OXIDE WITH INACTIVE METAL

In carrying out a process of this invention, having selected a refractory oxide filler, an inactive metal, and a bonding metal as above described, one surrounds the filler particles with the inactive metal and then dilutes the inactive metal with a bonding metal while maintaining the filler as separate particles. In Figure 1 of the drawings there is represented a body of inactive metal 2 surrounding dispersed refractory oxide particles 1, a body of bonding metal 3 being shown in contact with, but not commingled with, the inactive metal. In Figure 2, the inactive metal is represented as having been diluted with the bonding metal to form a mixture of metals 4 in which the refractory oxide particles 1 remain dispersed.

The method used for surrounding the refractory oxide particles with inactive metal must be one which will not cause the particles to agglomerate or to grow to a size outside the stated range. With high-melting inactive metals such as iron, cobalt, nickel, molybdenum, and tungsten this poses a problem, particularly with any but the most refractory of fillers. Accordingly, in a preferred aspect of the invention the inactive metal-filler concentrate is prepared by precipitating a compound of the metal, in which the metal is in an oxidized state, in contact with the dispersed filler particles, and then reducing the metal compound to the corresponding metal, as by treating it, after drying, with hydrogen at elevated temperature.

The precipitated compound of the inactive metal can be the oxide, hydroxide, hydrous oxide, oxycarbonate, or hydroxycarbonate. Since these compounds, as precipitated, usually contain varying amounts of water, they can be referred to generally as hydrous, oxygen-containing compounds of the metal.

The precipitated inactive metal compound can be one of a single metal or of two or more metals. For example, the hydrous oxides of both nickel and cobalt can be deposited around a filler. In the latter case, an alloy of cobalt and nickel is produced directly, during the reduction step. In similar manner, alloys of iron, cobalt or nickel, for example, can be prepared with other metals which form hydrogen-reducible, hydrous, oxygen-containing compounds. Thus, alloys with copper, molybdenum, tungsten, and rhenium can be prepared by co-depositing two or more oxides of the selected metals on the filler particles.

The hydrous, oxygen-containing compound can be precipitated from solutions in which it is present as the corresponding soluble salt. Preferably, the salt is a metal nitrate, although metal chlorides, sulfates, and acetates can be used. Ferric nitrate, cobalt nitrate, nickel nitrate, ammonium molybdate, and sodium tungstate are among the preferred starting materials.

Methods for precipitating oxygen-containing metal compounds from solutions of the corresponding metal salts are well known in the art and any such method can be used. For instance, an alkali can be added to a solution of the metal nitrate. When, on the other hand, the metal is in the form of a basic salt, such as sodium molybdate, precipitation can be effected by acidifying.

A preferred method for surrounding the filler particles with the oxygen-containing compound of inactive metal is to coprecipitate the filler particles from a colloidal aquasol simultaneously with the precipitation of the inactive metal compound. One convenient way to do this is to add, simultaneously but separately, a solution of the soluble metal salt, a colloidal aquasol containing the filler particles, and an alkali such as sodium hydroxide, to a heel of water. Alternatively, a dispersion containing the filler particles can be used as a heel and the metal salt solution and alkali added simultaneously but separately thereto.

During such a coprecipitation process certain precautions are preferably observed. It is preferred not to coagulate or gel the filler particles. Coagulation and gelation are avoided by working in dilute solutions, or by simultaneously adding the filler and the metal salt solution to a heel.

The filler particles should be completely surrounded with the precipitated, reducible inactive metal compound, so that when reduction occurs later in the process, aggregation and coalescence of the filler particles is avoided. In other words, the particles of the filter are discrete and not in contact, one with another, in the co-precipitated product. Vigorous mixing and agitation during the co-precipitation helps to insure the desired result.

After depositing the insoluble inactive metal compound on the filler, any salts present are removed, as by washing. When one uses an alkali such as sodium hydroxide, potassium hydroxide, lithium hydroxide, ammonium hydroxide, or tetramethylammonium hydroxide to effect precipitation, salts such as sodium nitrate, ammonium nitrate or potassium nitrate are formed. These should be removed. One of the advantages of using the nitrate salts in combination with aqueous ammonia is that ammonium nitrate is volatile and therefore is easily removed from the product. However, the tendency of many metals, such as cobalt and nickel, to form amine complexes is a complicating reaction in this case. By carefully controlling the pH during coprecipitation, these side reactions can be avoided.

A very practical way to remove salts is by filtering off the precipitate and washing it on the filter or repulping the filter cake and again filtering.

After removing soluble salts the product is dried, preferably at ultimate temperatures above 100° C. Alternatively, the product can be dried, and the dry material suspended in water to remove the soluble salts, and the product thereafter redried.

The relative amount of insoluble inactive metal compound deposited upon the filler particles depends in part on the nature of the end product which it is desired to produce. For example, if the product is to be reduced and compacted directly to a dense mass of filled metal, after diluting with a relatively small amount of the bonding metal, then from 0.5 to 10 volume percent of filler in the metal composition is a preferred range, and 1 to 5 volume percent is even more preferred. On the other hand, if the product is to be used as a masterbatch, as, for example, for blending with a considerable quantity of unmodified metal powder before compaction, then considerably higher volume loadings can be used.

Volume loadings as high as 50 percent, that is, one volume of oxide for each volume of metal present, can be successfully used, but such products are often pyrophoric. Even heating to 1000° C. after reduction does not completely eliminate this problem.

The pyrophoric tendency is minimized as the volume loading is decreased. In the range of 40 to 50 volume percent of filler, it is advisable to protect the modified metal in an inert atmosphere (hydrogen, argon or helium) until the material is blended with unmodified metal and compacted. At 30 volume percent, one can usually sinter the modified metal mass sufficiently that it can be handled in air.

The amount of precipitated inactive metal compound which it is desired to deposit upon the filler will vary somewhat with the particle size of the filler and especially with its surface area. Thus, with the smaller sizes of filler particles, having surface areas greater than $200/D$ m.$^2$/g., D being the density of the filler in g./ml., volume loadings of from 0.5 to 5 percent are preferred. With relatively large particles—those, for example, in the size range of 100 millimicrons—one can use volume loadings near the upper end of the ranges above mentioned.

Having deposited on the filler particles the precipitate of compound of inactive metal in oxidized state, and washed and dried the product, the next step is to reduce the inactive metal compound to the metal. This can be done conveniently by subjecting the coated particles to a stream of hydrogen at a somewhat elevated temperature. The temperature throughout the entire mass must not be allowed to exceed the sintering temperature of the filler particles. One way to accomplish this is to place the product in a furnace at a controlled temperature and add hydrogen gas slowly; in this way, the reduction will not proceed so rapidly that large amounts of heat are liberated causing the temperature to get out of control.

The hydrogen used in the reduction can be diluted with an inert gas such as argon to reduce the rate of reaction and avoid "hot spots." In this way the heat of reaction is carried away in the gas stream. Alternatively, the temperature in the furnace can be slowly raised into the range of 500 to 1000° C. while maintaining a flow of hydrogen over the product to be reduced.

In addition to or instead of hydrogen, other reducing gases such as carbon monoxide, or methane and other hydrocarbon gases can be used as the reducing agent. In any case, it is important to control the temperature during reduction, not only to avoid premature sintering as above mentioned, but also so that excessive reaction will not occur between the reducible inactive metal compound and the filler oxide prior to complete reduction of the inactive metal compound.

Reduction should be continued until the inactive metal compound is essentially completely reduced. When reduction is nearing completion, it is preferred to raise the temperature to the range between 700 and 1300° C. to complete the reaction, but care must be taken not to exceed the melting point of the reduced metal. During the reduction process very fine metal grains are formed. These tend to fuse and grow, but their ultimate size is restricted because of the presence of the filler particles. Thus, the size of grains obtained in this way is usually less than 10 microns.

Reduction should be carried out until the oxygen content of the mass is substantially reduced to zero, exclusive of the amount of oxygen originally introduced in the form of the oxide filler material. In any case, the oxygen content of the product, exclusive of the oxygen originally introduced in chemically combined form in the filler, should be in the range from 0 to 2 percent and preferably from 0 to 0.1 percent, based on the weight of the product.

The analysis for oxygen can be done by many methods with which the art is familiar, one such method being vacuum fusion as described by R. A. Yeaton in Vacuum, vol. 2, No. 2, page 115, "The Vacuum Fusion Technique as Applied to Analysis of Gases in Metals."

Oxygen, other than that combined with filler, may interfere with the function of the bonding metal, by reacting with the bonding metal to yield bonding metal oxide. For this reason the oxygen level should be maintained in the range above stated until after mixing with the bonding metal is complete.

After the reduction reaction is complete, the resulting powder is sometimes pyrophoric. Therefore, it is preferred to cool the mass in an inert atmosphere until it has been diluted with the bonding metal and compacted.

The dispersions of filler in inactive metals, useful in the processes of this invention, are characterized as follows: (*a*) the average particle size of the filler is in the range from 5 to 500 millimicrons, (*b*) the volume loading of filler in the inactive metal is in the range 0.5 to 50 volume percent, preferably in the range 1 to 30 volume percent, (*c*) the oxygen content, exclusive of the filler is in the range 0 to 2 percent, preferably 0 to 0.1 percent, (*d*) the average size of the metal grains in the metallic fraction of the composition is less than 40 microns, preferably less than 10 microns, said grain size being measured after annealing in hydrogen for 24 hours at a temperature in degrees absolute which is 0.8 times the melting point of the metal in the composition, (*e*) the average interparticle distance between oxide particles is less than 2 microns, preferably less than 0.5 micron, and (*f*) the metal is the continuous phase.

DILUTING THE INACTIVE METAL WITH A BONDING METAL

In the refractory oxide filler-inactive metal dispersions prepared as just described, the bond between the filler and the inactive metal is relatively weak. This appears to be explainable on the basis that the oxide particles are not wetted by the inactive metal. Whatever may be the explanation, it is found that when the compositions are melted, the refractory oxide agglomerates and drosses out. When the compositions are again solidified, no improvement in high-temperature properties of the metal is noted. Such dispersions are restricted to fabrication by powder metallurgy techniques which do not involve melting.

According to the present invention, the bond between the dispersed refractory oxide particles and the inactive metal is strengthened by diluting the inactive metal with chromium as a bonding metal.

The proportion of bonding metal required to improve the bond between the dispersed refractory oxide and the inactive metal is relatively small, on the molar basis, as compared to the total number of moles of refractory oxide present. In general, at least 4 mole percent is necessary to give an effect; however, the amount required will vary directly with the surface area, and a finely divided, very high surface area filler will require proportionately more bonding metal than will a filler in which the particle size is relatively large.

From a knowledge of the ultimate particle size or of the surface area and density of a given refractory filler, one can calculate the mole percentage of the filler which is on the surface of the particle. From such a calculation, one can then determine the amount of bonding metal to use. It is preferred to use as much bonding metal as calculated to be required for coverage of the filler particles to a thickness of 2 to 10 molecular layers, or in certain instances, somewhat more.

With the foregoing considerations in mind, the inactive metal is diluted with the bonding metal. This can be accomplished by the method, more particularly described in the examples given hereinafter, in which dilution of the inactive metal with chromium is effected by coprecipitating hydrous oxides of the inactive metal and of chromium, together with the refractory oxide filler, washing, drying and pulverizing the precipitate, and reducing the inactive metal oxide and the chromium oxide therein to the respective metals at elevated temperature with pure, dry hydrogen. The reduced powders are then compacted to a dense mass of metal, as by pressing in a die, by extruding, by rolling, or by any of the techniques used in powder metallurgy. The compacted mass of metal should have a density upwards of 95 percent of theoretical, preferably upwards of 98 percent. The "green" compact formed is sintered, as at temperatures up to 90 percent of its melting point for up to 24 hours, to give it sufficient strength to hold together during subsequent working operations. Preferably, such sintering is effected in an atmosphere of clean, dry hydrogen.

The formed body so obtained is then subjected to intensive working, preferably at elevated temperatures. The working forces should be sufficient to effect plastic flow in the metals. Working should be continued until homogenization of the filler-inactive metal grains and bonding metal grains is substantially complete. Homogeneity can be determined by metallographic and chemical analyses. Because the filler in the inactive metal originally was present as substantially discrete particles, the worked metal product is characteristically substantially free of "fibering"—that is, alignment of filler particles in the direction of working.

While working can be accomplished by such methods as swaging, forging, and rolling, it is especially preferred to effect working by extruding the above-mentioned green compact through a die under extreme pressure, at temperatures approaching the melting point of the metals present, say, from 85 to 95 percent of the melting temperatures in degrees absolute. Because the compositions of the invention are very hard, the working conditions needed are much more severe than for the unmodified alloys. In the case of extrusion of a billet, the reduction in cross sectional area preferably is upwards of 90 percent. Welding of the metal grains becomes nearly complete.

Now while the worked products have greatly increased strength and usually have increased hardness, they nevertheless are ductile.

Some oxide particles grow in size when aged in metals at very high temperatures. This tendency is less for the very stable oxides, i.e., those of highest free energy of formation. To avoid particle growth as much as possible, the length of time at which products of the invention are maintained at elevated temperature during processing should be minimized. Also, for alloys which are to be processed at very high temperatures, the most stable oxides should be selected as fillers.

THE NOVEL COMPOSITIONS

The products produced according to this invention are metalliferous compositions comprising a non-fibered dispersion of the refractory oxide filler particles in a mixture of metals having a melting point above 700° C., the mixture containing an inactive metal and chromium as a bonding metal. It will be understood that the term "mixture" is generic to alloys as well as to compositions showing phase equilibrium.

In the compositions, the particles of refractory filler are substantially completely surrounded by a coating of metal, which maintains them separate and discrete. The particles are isolated and do not come in contact with each other. Thus, coalescence and sintering of the particles is prevented. In other words, the compositions comprise a continuous phase of metal containing dispersed therein the refractory oxide filler particles.

A preferred class of the novel products consists of high-melting compositions, particularly those containing at least one of the metals from the group consisting of iron, cobalt, nickel, molybdenum, and tungsten, together with chromium. Of this group alloy compositions having a melting point above 1200° C. are particularly advantageous.

The novel products consist of alloys containing chromium. These alloys are particularly oxidation-resistant. Because they have high-temperature strength by reason of the inclusion of the refractory oxide filler, they are useful at elevated temperatures, for instance in the range of 1200 to 1800° F. and in some cases even higher. Stainless steel alloys are included in this preferred class. One can make other alloys of chromium such as "Nichrome" (80 Ni–20 Cr), iron-chromium (73 Fe–27 Cr), and iron-nickel-cobalt-chromium alloys containing, for example, up to 30 percent chromium. Iron, nickel or cobalt base alloys containing from 10 to 25 percent chromium are a preferred group. Specifically, such alloys containing 90 to 50 percent of the sum of iron, cobalt and nickel, 0 to 20 percent of the sum of molybdenum and tungsten, and 10 to 25 percent chromium are an especially preferred species.

In the above-mentioned chromium alloys, and other high-temperature alloys, it is preferred to use very stable refractory oxide fillers, that is, those with a high free energy of formation such as beryllia, calcia, thoria, and rare earth oxides, the filler having a free energy of formation, measured at 1000° C., in the range above 115 kilocalories per gram atom of oxygen in the oxide. Oxides having a $\Delta F$ at 1000° C. of up to 123 are presently available, and if more stable oxides could be prepared, they would be in the preferred class.

An especially preferred class of the novel products consists of alloys containing as the inactive metal molybdenum, or tungsten, or both. Molybdenum and tungsten have extremely high melting points and their presence raises the melting point of the alloy products formed. Thus, this preferred group includes such alloys as high-molybdenum steel, nickel-molybdenum steel, and molybdenum-iron-nickel alloys, said alloys containing chromium. With this class, also, alloys of molybdenum or tungsten with iron, cobalt or nickel are particularly preferred.

The filler particles in the novel metal products are in the size range of 5 to 500 millimicrons, preferably from 5 to 250 millimicrons, still more preferably from 10 to 250 millimicrons. Particles of the latter class are considerably more resistant to coagulation or gelling than are smaller particles. They are thus easier to maintain in a dispersed state during processes of the invention. Moreover, particles in the 10 to 250 millimicrons range are readily produced by employing colloidal aquasols in the processes of the invention.

Since the particle size of the refractory filler is important, it is also important to maintain the filler particles in the specified size range during processes of the invention and in the novel products. Thoria, rare earth oxides, mixtures of oxide of rare earth elements of the lanthanum and actinium series, magnesia, beryllia, and to a lesser extent, alumina have exceptional stability against particle growth at elevated temperatures. This is important when the novel products are to be subjected to very high temperatures for long periods of time. The resistance to growth of the refractory oxide particles appears to be related to their free energy of formation. For this reason, preferred compositions of the invention for service at very high temperatures comprise inactive-metal bonding-metal mixtures in which the filler oxide particles have a free energy of formation, per gram atom of oxygen in the oxide, from 90 to 123 kilocalories, and preferably from 115 to 123 kilocalories, as determined at 1000° C.

The free energizes of formation of many of the filler oxides can be found in Smithells, "Metals Reference Book," Interscience Publishers, Inc., 1955, 2nd edition, vol. 2, pp. 590 to 592. Some of this data is shown in the foregoing tables. For instance, the free energy of formation of thoria, $ThO_2$, is 238 kilocalories per mole at 1000° C. Since each mole contains two oxygen atoms, the value is 119 kilocalories per gram atom of oxygen. In the case of alumina, $Al_2O_3$, the $\Delta F$ is 309 kilocalories per mole or 103 kilocalories per gram atom of oxygen, as measured at 1000° C.

Products of the invention can also be characterized by the distance between the filler particles, a variable which depends on both volume loading and particle size. If the dispersed phase is a material of uniform particle size and is dispersed homogeneously in a cubic packing pattern, the following expression relates the interparticle distance, i.e., the edge to edge distance "Y," to the particle diameter "$d$" and the volume fraction of the dispersed phase "$f$":

$$Y = d\left[\left(\frac{1}{1.91f}\right)^{\frac{1}{3}} - 1\right]$$

For products of this invention, the interparticle distance as calculated by this expression is less than 1.0 micron and preferably from 0.01 to 0.5 micron (10 to 500 millimicrons). In the most preferred products this range is 50 to 250 millimicrons.

Since at volume loadings greater than 10 percent ductility begins to drop off significantly, a preferred combination is an interparticle distance of 10 to 250 millimicrons and a volume loading of 0.5 to 10 percent. It will be understood that this refers to the final metal composition.

The finely divided oxide particles in compositions of the invention causes the grain size to be much smaller than normally found. This small grain size persists even after annealing at temperatures in degrees absolute up to 0.8 times that of the melting point of the products. A grain size below 10 microns, and even below 2 microns is common for the products of this invention. Products which have oxide particles in contact with metal grains in the size range below 10 microns are preferred.

The grain size, $G$, can be calculated, approximately, from the relationship $$G = \frac{0.37 d}{f}$$

where $d$ is the diameter of the filler particle and $f$ is the volume fraction. Grain size can be observed, experimentally, by ordinary etching and measuring techniques. Usually the observed values are equivalent to or smaller than the calculated values.

Products in which the refractory filler particles are substantially discrete and dense are preferred compositions of the invention. Preferred also are products in which the filler is in the form of essentially isotropic particles—that is, particles which are spheroidal or cubical in shape. It is also desirable that the filler particles be anhydrous.

The solid metal products of the invention are further characterized in that they are substantially free of fibering of the dispersed refractory oxide. This is a consequence of their novel process of preparation, wherein the oxide is first dispersed with respect to the inactive metal and the dispersion is diluted with the bonding metal. Fibering is a result of agglomerated particles being fragmented during working, as by extrusion; the fragments show a definite and easily discernible alignment. Such alignment gives a starting point for crack propagation and ultimately leads to failure of the metal under stress, especially at high temperatures. Its avoidance is a distinct advantage of the novel composition.

The products are also distinguished from the corresponding unmodified metal mixtures by their exceptional mechanical properties at elevated temperatures. For example, the creep rates of the modified products are from one tenth to as low as 1/100 of those of the unmodified alloys when compared at elevated temperatures.

The stress which the modified alloys will support over a period of time at high service temperatures is at least two to five times larger than that of the unmodified alloys. The resistance of the filler-modified alloys to long-term deformation under relatively low stress may be as much as ten thousand times better than that of the corresponding unmodified alloys. For instance, the stress for 100 hour rupture life of iron, cobalt or nickel base alloys containing 10 to 30 percent chromium and containing oxide filler as herein described, is improved at least two fold when measured at 1800° F. Not only are the products strong, but they are ductile, readily machinable, and show considerable elongation under stress, up to 90 percent of that of unmodified control.

By incorporating dispersed refractory particles into metal mixtures according to the invention the yield strength of the mixtures is quantitatively improved while the ductility of the mixtures, as measured by the elongation, remains adequate for practical purposes. If $Ym$ is the yield strength of the modified material at 0.2 percent offset, $Yc$ is the corresponding yield strength of the control, $Em$ is the elongation of the modified material, and $Ec$ is the elongation of the control, the following relationships hold at temperatures as high as 75 percent of the melting point of the metal mixtures in degrees absolute:

(1) $\frac{Ym}{Yc}$ = greater than 1.5 : 1

(2) $\frac{Ec}{Em}$ = less than 6 : 1

By reason of the presence of the bonding metal, preferred compositions of this invention can be extruded, and hot or cold rolled, without substantial deterioration in their properties.

The products of this invention are useful as materials of construction, especially in applications involving extended use at elevated temperatures. For example, turbine blades and other components of high-temperature power plants, aircraft skins, high-speed cutting tools, electrical heating elements, etc. can advantageously be fabricated from the refractory oxide-filled metals.

The products of the invention can also be used as alloying agents with metals melting below 700° C.

The invention will be better understood by reference to the following illustrative examples:

*Example 1*

This example describes a modified stainless steel composition containing 3 percent thoria by volume dispersed therein, the thoria being in the form of colloidal particles. This chromium alloy is a preferred composition of the invention.

A deposit of iron-nickel chromium hydrous oxycarbonate was formed on a colloidal thoria filler in a reactor consisting of a stainless steel tank with a conical bottom. The bottom of the tank was attached to stainless steel piping, to which were attached three inlet pipes through T's, this circulating line then passed through a centrifugal pump of 20 g.p.m. capacity, thence through a return line to the tank.

Initially, the tank was charged with 2 gallons of water. Equal volumes of three solutions containing the desired quantities of reagents were then added into the middle of the flowing stream through the T tubes. These solutions were added at uniform, equivalent rates using the following feed solutions: (a) 3.7 liters of solution prepared from 2,043 g. Fe(NO$_3$)$_3$.9H$_2$O, 198 g.

$$Ni(NO_3)_2.6H_2O$$

555 g. Cr(NO$_3$)$_3$.9H$_2$O and distilled water, (b) 33.10 g. Th(NO$_3$)$_4$.4H$_2$O dissolved in distilled water and diluted to 3.7 liters, and (c) 3.7 liters of 3.5 M (NH$_4$)$_2$CO$_3$. The solutions were added to a heel of water over a period of 48 minutes. The final pH was 7.60. The resulting slurry was filtered, washed and dried in an oven at 240° C.

This powder was pulverized to 325 mesh and then reduced with hydrogen. Extreme care was taken to purify and dry the hydrogen used. Thus commercial tank hydrogen was passed through a drier to remove the water, and then over chips of chromium and zirconium-titanium, said chips held at 850–900° C., in order to remove oxygen and nitrogen. In this way, extremely dry, pure hydrogen was prepared.

The first stage of the reduction was carried out at 700° C. In this manner Ni-Fe metal, containing ThO$_2$ particles, and intimately admixed with Cr$_2$O$_3$, was produced. The temperature was then raised to 1100° C., and the Cr$_2$O$_3$ converted to Cr. Passage of pure dry hydrogen over the sample at 1100° C., was continued until the dew point of the effluent hydrogen was −50° C. Oxygen analysis of the final mixture showed that there was less than −0.05 percent oxygen present in excess of the oxygen in the ThO$_2$.

The metal powder was compacted and worked until the metallic fraction was homogenized, i.e., until the Ni-Fe fraction was diluted with the Cr fraction. The product was a fine powder of stainless steel, containing a uniform dispersion of 150 m$\mu$ ThO$_2$ particles, at a volume loading of 3 percent, the particles having an interparticle distance of 240 millimicrons.

When fabricated to a dense piece of metal, the resulting stainless steel had improved creep resistance, particularly when compared with untreated alloy at elevated temperatures, say 1500° F. It was also harder than a control. Thus, after annealing at 1000° C., the sample had a Rockwell B hardness of 95, and a grain size in the metal of about 1.5 microns.

*Example 2*

A nickel-chromium alloy containing 5 volume percent thoria was prepared in the following manner: Using the reactor described in Example 1, a hydrous nickel oxide-chromium oxide-thoria precipitate was prepared as follows: Through the first T, 5 liters of a solution containing 3052 g. Ni(NO$_3$)$_2$.6H$_2$O and 1132 g. Cr(NO$_3$)$_3$.9H$_2$O was fed. Into the second was fed 5 liters of thoria sol, made from 1440 g. of 2.5 percent ThO$_2$ sol (10 millimicron ThO$_2$) and into the third, 5.5 liters of 30 percent (NH$_4$)$_2$CO$_3$. During the precipitation the pH was maintained at 7.2.

The washed, dried, pulverized powder was reduced at 645° C. for 12 hours, then at 950° C. for an additional 6 hours, and finally at 1100° C. for 80 hours. During all this time preheated, very pure hydrogen was fed into the reduction chamber at a very rapid rate. The dew point of the effluent hydrogen was −55° C. at the end of the reduction. In this way the nickel and chromium oxides were essentially reduced to metal, and a metal powder containing 120 millimicron particles, uniformly dispersed and on the average 150 millimicrons apart, is produced.

The metal powder so produced was compacted into a mass, having an apparent density of more than 99 percent of absolute. It was then hot-extruded to an area-reduction ratio of 16:1. This intensively worked product had improved high-temperature strength and oxidation resistance when compared with wrought "Nichrome." For example, it had a hardness (Rockwell B) after annealing at 1200° C. of 99, and a grain size of 1.2 microns. It could be extruded into wires and used as a heating element material; in this way the service temperature range of the alloy wire was increased. The product had a yield strength at 0.2 percent offset at 1500° F. of 45,000 p.s.i. and at 1800° F., 16,000 p.s.i. and an elongation of 12 percent.

In a similar way, other alloys of chromium can be prepared. Thus, a cobalt-nickel-tungsten-chromium alloy can be prepared by coprecipitating hydrous oxides from salts containing these metals. For such alloys, and other alloys like those described in Example 1, it is preferred to use oxides having very high free energies of formation, such as La$_2$O$_3$, BeO, or Y$_2$O$_3$. When less stable oxides are used, such as MgO, or when one wishes to minimize particle growth of the oxide filler, one should keep the temperature during reduction as low as possible, as, for example, by using a powerful drying agent like CaH$_2$ or Ti metal near the material being reduced. In this manner, the reduction can be carried out at 1000° C., or even slightly less. It is also advantageous to do this with very stable oxides like ThO$_2$, or La$_2$O$_3$, or Y$_2$O$_3$ if one wishes to get the maximum effect of these fillers, because by this means reduction time is decreased and growth of the filler particles is minimized.

Alloys, like the modified "Nichrome" of Example 2, are very hard, hence somewhat difficult to fabricate into sound metallurgical specimens. In order to offset this problem, one can either use lower volume loadings, i.e., in the range of 0.5 to 1 percent, or one can dilute the filled metal with unfilled metal powder, using, for example, from ½ to 10 parts of the latter per pound of filled metal.

*Example 3*

This example describes alloys of chromium and tungsten containing oxide filler. These represent a preferred group of products of the invention. They are particularly useful as alloying agents to add to other molten metals in preparing super alloys, as, for example, for preparing improved types of S–495, S–588, ATV–3, S–497, S–590, S–816, Refractaloy 70, Refractaloy 80, M–203, M–204, M–205, 25 Ni, Hastelloy C, Thetalloy C, HS–23, HS–25, HS–31, HS–36, X–50, WF–31, I–336, HE–1049 (see Appendix II, "Report on the Elevated-Temperature Properties of Selected Super-Strength Alloys," published by the American Society for Testing Materials, STP No. 60).

This reinforced chromium-tungsten alloy was prepared from four starting solutions: (a) 185 g.

$$(NH_4)_6W_7O_{24}.4H_2O$$

dissolved in 10 liters H$_2$O, (b) 780 g. Cr(NO$_3$)$_3$.9H$_2$O in 5 liters H$_2$O, (c) 20.5 g. ThO$_2$ as 10 millimicron colloidal particles in 5 liters H$_2$O and (d) 5 liters of 10 percent (NH$_4$)$_2$CO$_3$. These solutions were fed into 2 gals. of water in a reactor tank through 4 T tubes, as described in Example 1.

The precipitate was filtered, washed with a dilute (0.01 percent) solution of ammonium carbonate, dried and pulverized.

The pulverized powder was then reduced as follows: It was placed in a gas-tight furnace. The furnace was then heated to 250° C. and evacuated. The temperature in the furnace was raised to 500° C. and maintained there for 6 hours while an excess of extremely pure, dry hydrogen was passed over the powder. Thereafter, the temperature in the furnace was increased at the rate of 25 degrees per hour until 1100° C. was reached. Then the temperature was increased to 1250° C. and held there until the dew point of the effluent hydrogen was below −40° C.

During the reduction the following precautions were observed: Oxygen and nitrogen and their compounds were completely eliminated from the hydrogen feed. The water vapor produced during the reduction was swept out of the furnace by passing hydrogen over the sample at a high flow rate. The temperature in the reducing zone was kept constant, i.e., no variation from one place to another of more than 20 degrees.

The resulting chromium-tungsten powder, modified with 10 volume percent thoria is a product of the invention. For use as an alloying agent it can be compacted into pellets, or used directly as a powder.

The powder is characterized by having a uniform distribution of 200 millimicron particles throughout the metal. Thus the average interparticle distance is 140 millimicrons. The grain size of the metal is small, of the order of 1 to 5 microns. This grain size does not change appreciably in size, even on prolonged aging at 1200° C.

By increasing the amount of $ThO_2$, one can prepare metal products containing 20, 30, or more percent of oxide. By changing the ratio of $Cr(NO_3)_3 \cdot 9H_2O$ and $(NH_4)_6W_7O_{24} \cdot 4H_2O$, one can vary the ratio of Cr to W in the product. (Such a change may require an adjustment in the amount of $(NH_4)_2CO_3$ used.) By substituting $(NH_4)_6Mo_7O_{24} \cdot 4H_2O$ for the tungsten compound, one can prepare alloys of chromium and molybdenum. Further, one can substitute colloidal BeO, $La_2O_3$, $Y_2O_3$, $Ce_2O_3$, $Sm_2O_3$, $Sc_2O_3$, other of the rare earth oxides, including mixtures of rare earth oxides, in place of the colloidal thoria, and thus prepare Cr-W alloys containing any of these other oxides.

In such alloys it is preferred to use oxides in the form of particles less than 250 millimicrons in size, on the average, and oxides which, at 1000° C., have a free energy of formation per gram atom of oxygen greater than 115 kilocalories. Also it is preferred to use reduction temperatures as low as is possible, commensurate with completely reducing the $Cr_2O_3$ to Cr.

This application is a continuation-in-part of our prior application, Serial No. 703,477, filed December 13, 1957, as a continuation-in-part of our then copending application, Serial No. 637,746, filed February 1, 1957 as a continuation-in-part of our then copending parent application, Serial No. 595,770, filed July 3, 1956, the latter two of which are now abandoned.

We claim:

1. A solid, ductile metalliferous composition comprising a dispersion of a particulate refractory oxide filler in a metal component, said metal component consisting essentially of a mixture of a metal (a) having an oxide with a free energy of formation at 27° C. of up to 75 kilocalories per gram atom of oxygen in the oxide, and chromium metal, said particulate refractory oxide being in the form of substantially discrete particles having an average dimension of 5 to 500 millimicrons and a surface area, in square meters per gram, of from 12/D to 1200/D where D is the density of the particles in grams per milliliter, said particles comprising a refractory metal oxide which is insoluble in the metal mixture, is thermally stable to at least 500° C., and has a metling point above 1000° C. and a free energy of formation at 1000° C. above 90 kilocalories per gram atom of oxygen in the oxide, the proportion of chromium being at least 4 mol percent based upon the dispersed metal oxide particles, the mixture of metals having a melting point above 700° C., and the dispersion being substantially free of fibering of the refractory oxide particles, the oxygen content of the composition, in excess of oxygen in said filler particles, being from 0 to 2% by weight, the size of the metallic grains being smaller than 10 microns, and said metal composition being characterized by having a yield strength, at 0.2% offset and a temperature of 75% of the melting point of the metal in degrees absolute, at least 1.5 times that of the metal unmodified by refractory oxide particles, and by having improved oxidation resistance as compared with said unmodified metal.

2. A composition of claim 1 in which the refractory oxide has a free energy of formation at 1000° C. above 115 kilocalories per gram atom of oxygen in the oxide.

3. A composition of claim 1 in which the oxygen content, in excess of oxygen in the filler particles, is from 0 to 0.1% by weight.

4. A composition of claim 1 in which the metal (a) is selected from the group consisting of iron, cobalt, nickel, molybdenum and tungsten, the filler particles have a free energy of formation at 1000° C. in the range above 115 kilocalories per gram atom of oxygen, the proportion of chromium in the metallic phase is from 10 to 30 weigth percent, the proportion of oxide filler in the composition is in the range from 1 to 30 volume percent, and the oxygen content of the composition, in excess of oxygen in the filler particles, is from 0 to 0.1% by weight.

5. A composition of claim 4 in which the metal (a) is nickel, the filler is thoria, and the proportion of chromium in the metal mixture is about 20% by weight, whereby the stress for 100 hour rurture life of the metal composition is at least 5 times that of said metal without the filler.

6. A composition of claim 1 in powder form, the surface area of said powder being less than about 2 square meters per gram, whereby said powder is stable against air oxidation of the order of pyrophoricity.

7. A composition of claim 6 wherein the oxygen content of the powder, in excess of oxygen in the filler particles, is from 0 to 0.1% by weight.

8. In a process for producing a solid, ductile metalliferous composition having improved high-temperature properties the steps comprising preparing a refractory metal oxide in the form of substantially dicrete particles having an average dimension of 5 to 500 millimicrons and a surface area of from 12/D to 1200/D square meters per gram where D is the density of the particles in grams per milliliter, said refractory metal oxide being thermally stable to at least 500° C. and having a melting point above 1000° C. and a free energy of formation at 1000° C. above 90 kilocalories per gram atom of oxygen in the oxide, surrounding said refractory oxide particles with a metal (a) having an oxide with a free energy of formation at 27° C. of up to 75 kilocalories per gram atom of oxygen in the oxide, and diluting said metal (a) with chromium, while maintaining the refractory oxide as separate particles, said refractory oxide particles being insoluble in the mixture of metals (a) and chromium.

9. A process of claim 8 in which the metal (a) is selected from the group consisting of iron, cobalt, nickel, molybdenum, and tungsten, and the refractory particles are surrounded with metal by simultaneously coprecipitating hydrous oxygen-containing compounds of said metal (a) and of chromium from a solution of a salt of said metal (a) and a solution of a salt of chromium, respectively, and in contact therewith simultaneously coprecipitating the refractory oxide particles from a liquid suspension thereof, and reducing said hydrous oxygen-containing compounds to metal.

10. A process of claim 8 in which the surrounding of the refractory oxide particles with metal (a) is accomplished by precipitating a hydrous, oxygen-containing compound of metal (a) from a solution of a salt of said metal and in contact therewith, simultaneously coprecipitating the refractory oxide particles from a liquid suspension thereof, and reducing said hydrous, oxygen-containing compound to form metal (a).

11. A process of claim 10 in which the reduction is effected by passing a stream of dry hydrogen gas over the precipitated oxygen-containing compound of metal (a).

12. A process of claim 11 in which the reduction with hydrogen is continued until the oxygen content of the product, exclusive of the oxygen originally introduced in chemically combined form in refractory oxide filler, is in the range of from 0 to 0.1 percent by weight.

References Cited in the file of this patent

UNITED STATES PATENTS

| | | |
|---|---|---|
| 2,580,171 | Hagglund et al. | Dec. 25, 1951 |
| 2,823,988 | Grant et al. | Feb. 18, 1958 |